June 9, 1925.  
J. J. MERRILL  
OUTLET BOX  
Filed Sept. 14, 1921    2 Sheets-Sheet 1

Inventor,
John James Merrill

Patented June 9, 1925.

1,540,893

UNITED STATES PATENT OFFICE.

JOHN JAMES MERRILL, OF IPSWICH, MASSACHUSETTS, ASSIGNOR, BY MESNE ASSIGNMENTS, TO ELECTRIC OUTLET COMPANY, INC., OF NEW YORK, N. Y., A CORPORATION OF NEW YORK.

OUTLET BOX.

Application filed September 14, 1921. Serial No. 500,525.

*To all whom it may concern:*

Be it known that I, JOHN JAMES MERRILL, a citizen of the United States, and a resident of Ipswich, county of Essex, State of Massachusetts, have invented an Improvement in Outlet Boxes, of which the following is a specification.

This invention relates to outlet boxes for electrical installations, which are primarily designed to support electric light fixtures or switches, and, particularly, to outlet boxes which are especially adapted for use in connection with a lath and plaster wall or ceiling which has previously been constructed.

In the installation of electrical conductors in buildings in which the inner walls have already been constructed, two particularly important difficulties have usually been encountered. First, the difficulty of "fishing" the conductors through the outlet openings, particularly when metallic covered conduits are employed, and second, the difficulty in providing a suitable support for the fixture, particularly when the inner wall is constructed of lath and plaster.

The method of installation in most general use has been to bore a hole through the inner wall, "fish" the conductors through the hole and then secure the outlet box or plate to the laths by ordinary wood screws. With this method, the hole which is formed is necessarily so small that access to the space between the walls is difficult, and, in attempting to "fish" the wires, the plaster is frequently broken out about the hole. Also in drawing metal covered conduits through the hole to make the connection, the same result is liable to occur, and this is particularly liable to occur if, in the formation of the hole, a lath should be severed, so that it is liable to be pulled outward during the fishing operation. In consequence, the plaster frequently has to be repaired after the outlet has been installed.

It is a well known fact that wood screws, which are screwed into laths, are liable to provide a very insecure support, and, when a fixture support is attached by such means, the screws are liable to split the laths and some of the screw holes in the fixture frequently are opposite spaces between the laths. Fixtures are therefore, frequently supported insecurely by such means. Difficulty is also frequently encountered, when the support is held in place by such means in setting the support so that the fixture when attached, will extend perpendicularly to the wall.

The primary objects of my invention are to provide a form of outlet fitting in which a hole of maximum size may be provided in the wall, through which the conductors may be fished, and to provide means for effectively protecting the plaster about the opening and for holding the laths in place, so that they cannot be moved so as to break out the plaster, and, in the same connection, to provide a support for the fixture, which will be as strong as the wall itself.

I accomplish these objects by providing a clamp which comprises a pair of collars adapted to be held in register with the wall opening at opposite sides of the wall, and to be clamped there against, so that they are securely attached thereto, and, in this position, will afford an effective means for protecting the wall portions adjacent the opening, and by providing, in connection therewith, a casing or other form of outlet closure, or fixture support, which is adapted to be attached to the outer clamp member while, the members are clamped to the wall and after the wires have been fished through the opening in the collars.

For a more complete understanding of my invention reference is made to the accompanying drawings in which.

Figure 1:
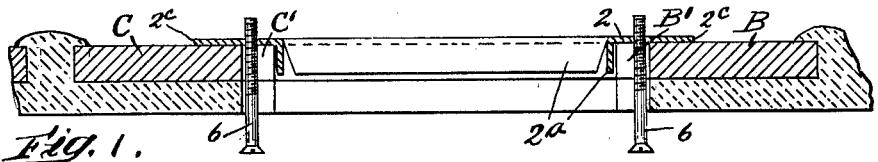
Figs. 1 to 3 are sectional views of the members of the wall opening collars, which I employ, illustrating the method of installation, Figs. 1 and 3 being views taken at line *x—x*, and Fig. 2 at line *y—y* of Fig. 6.

According to my invention, I provide a pair of sheet metal clamp collars 2 and 4, which, in shape and size, are identical in construction, and are each provided with a square opening, in the formation of which the material is so cut and bent at right angles as to provide a lip, 2ᵃ and 4ᵃ, at each side of the opening. Two of the opposite outer peripheral edges 2ᵇ, of collar 2 are parallel and the distance therebetween is slightly less than the length of the diagonal of the wall opening, in connection with which it is to be employed, and the other peripheral two edges, 2ᶜ, are arc-shaped, or rounded, the distance, between the middle points thereof being preferably made somewhat greater than the distance between the parallel edges 2ᵇ, and nearly equal to the average transverse distance between the middle points in alternate laths, of a lath and plaster wall.

The portions of the collar 2, having the rounded edges 2ᶜ, each have a screw threaded hole 2ᵈ in the middle portion thereof, closely adjacent the lip 2ᵃ, and screws 6 are threaded in said holes, respectively, the corresponding portions of the collar 4, having correspondingly located holes 4ᵈ, of a diameter greater than the threaded portions of the screws 6, and less than that of the heads thereof, and holes 4ᵉ at one side thereof, and opening into the same, of greater diameter than that of the screw heads, so that the heads of the screws 6 may be passed thru the holes 4ᵉ and then, by lateral movement, may be passed into the holes 4ᵈ. The portions of the collar 4 enclosed by the curved edges thereof are also each provided with a pair of screw threaded holes 4ᶠ.

A sheet metal box, or casing, of cup-like form, is provided, the outer portion of which is square-sided and adapted to fit into the collars 2 and 4, in all corresponding positions, and the inner portion of which has two oppositely inclined sides 8ᵃ, which extend convergently from the square outer portion to the ends of the flat bottom, 8ᵇ, one dimension of the bottom being equal to the distance between the opposite sides and the other approximately one half said distance. Each of the inclined walls 8ᵃ is provided with two "knock out" portions, as 8ᶜ, which may be readily removed, to provide apertures for the entrance of the electrical conductors, as is customary in devices of this character, and a clamp 10 is provided on the inner side of the walls 8ᵃ, opposite each "knock out" portion, for clamping the conductors to the box. A flange 8ᵈ is formed integrally with the box, which projects therefrom at all sides of the outer end of its square portion, the edge of said flange being preferably circular and having the same radius as the curve on which the curved edges of the collars 2 and 4 are formed. Each quarter portion of the flange 8ᵈ is provided with a pair of screw holes 8ᵉ, so arranged that when the flange is held in any of its position of coincidence with the collar 4, two pairs of the holes 8ᵉ will be in exact register with the holes 4ᶠ, so that screws 9 may be passed thru the holes 8ᵉ and screwed into the holes 4ᶠ, to attach one to the other.

A screw threaded nipple 12 may be provided in the bottom of the box for the attachment of an electric light fixture, but, when the device is to be used for a switch box, this will be omitted and the bottom made without perforation.

The manner of installation of the box, which will be substantially the same, either in a side wall or a ceiling, is preferably as follows:—

A square opening is formed in the wall by removing a section of a lath, as A, of a length equal to the distance between adjacent edges of two alternate laths B and C and shallow notches B', C' are cut in the adjacent edges of the latter, at the middle of the opening. The collar 2 is then passed edge-wise and lengthwise thru the wall opening in a diagonal position, the distance between the parallel side edges 2ᵇ being less than the diagonal dimension of the opening, and then the collar is turned flatwise with its opening in register with the wall opening, so that the portions having the arc shaped edges rest on the uncut laths B C and the lips or flanges 2ᵃ extend into the wall opening, as shown in Fig. 1. This is preferably done with the screws 6 threaded therein, so that when the collar is in position, the screws will be located in the notches B' C', formed in the laths B, C, the length of said screws being sufficient to enable the heads thereof to be located at a substantial distance beyond the face of the wall, when the collar is in position.

Figure 2:
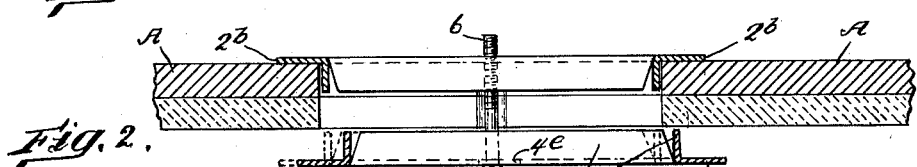
Figure 3:
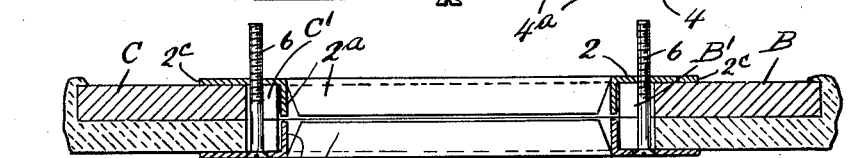

The collar 4 is placed in the opposite position to the collar 2, and then moved towards the wall, so that the heads of screws 6 pass thru the apertures 4ᵉ, and then it is moved edgewise, so that they pass into the apertures 4ᵈ, in which position it will be in register with the wall opening and then it will be pushed inward, so that the flanges 4ᵃ will enter the opening and the surface of the collar will engage the wall, as shown in Figs. 2 and 3, and then the screws 6 will be tightened, so that the wall will be firmly clamped between the flat portions of the collars, as shown in Fig. 3.

Figure 4:
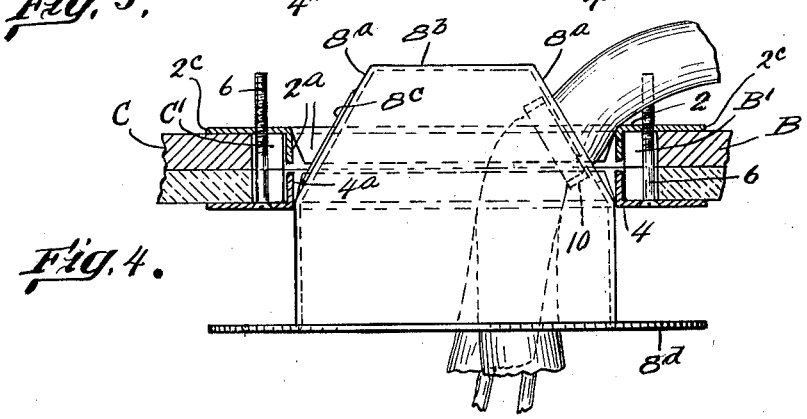
Figs. 4 and 5 are similar views showing the form of box which I employ in connection therewith, Fig. 4 being a section at line *x—x*, and Fig. 5, a section at line *z—z* of Fig. 6.
Figure 5:
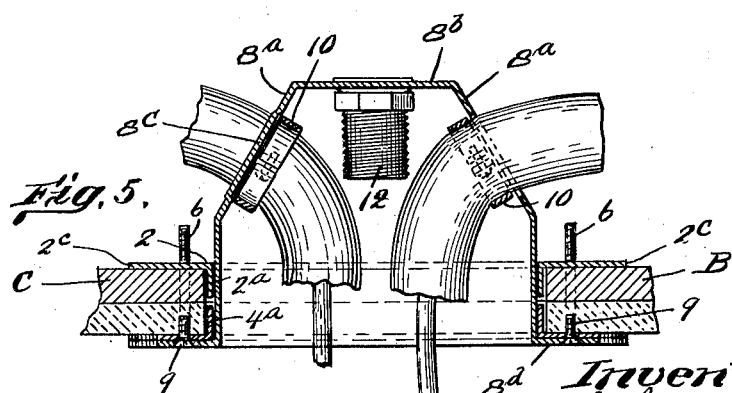
Figure 6:
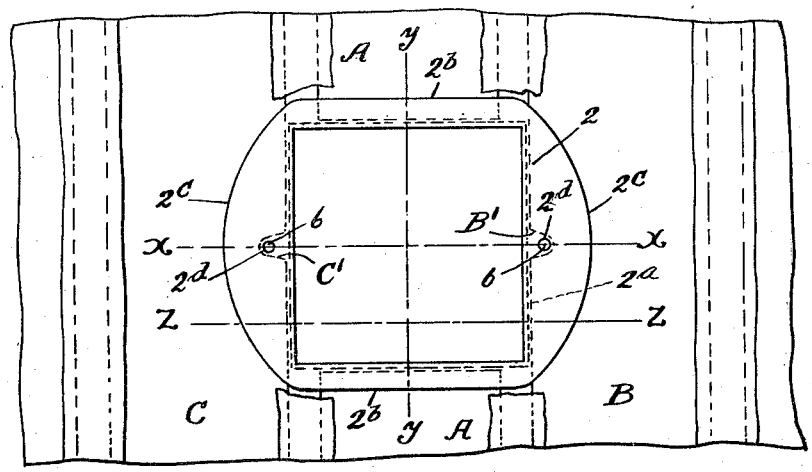
Figs. 6 and 7 are plan views of the inner and outer collar members, respectively.
Figure 7:
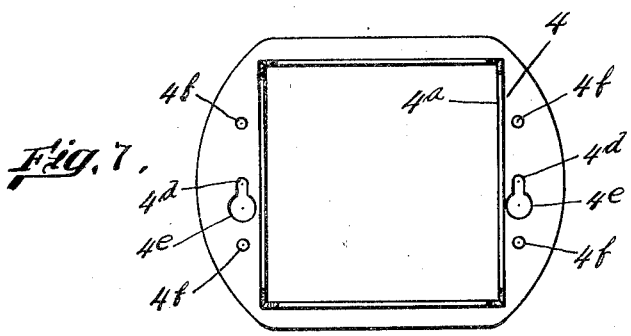
Figure 8:
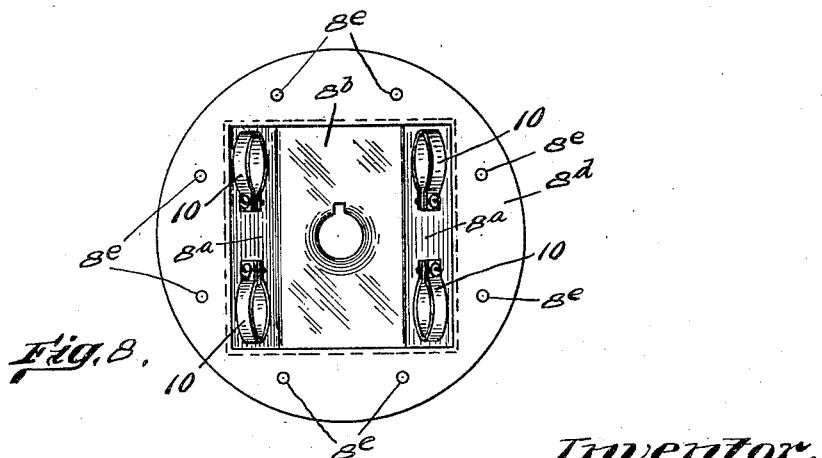
Fig. 8 is a plan view of the box, showing the interior thereof.

Under these conditions, the flanges 2ᵃ and 4ᵃ will nearly meet, so that the wall opening will be practically lined with metal, and the plaster and laths, about the opening, will be covered by the metal plates, of which the collars are composed. The conductors may then be drawn thru the wall opening and passed thru the apertures in the box, which will be held in such a position that the inclined walls 8ᵃ thereof face toward the direction from which the conductors run, and then will be inserted in the collars, as indicated in Fig. 4. It will be apparent that, on account of the provision of the inclined wall-portions 8ª in which the conductor apertures are formed, the insertion of the box, with the conductors therein, may be performed if the conductors have been drawn thru both inclined wall portions, as shown in Fig. 5.

The box is pushed inward until its flange 8ᵈ engages the collar 4, in which position two pairs of the holes 8ᵉ therein will register with the holes 4ᶠ in the collar and then the screws 9 will be passed thru the flange and screwed into the collar, firmly attaching the box thereto, and, as the collars are firmly clamped against the opposite sides of the wall, the box will be securely held in position.

The conductors will then be drawn tight thru the box apertures and clamped in place by the clamps 10, the latter serving as a ground connection for metal covered conductors.

The operation of drawing in the conductors is made less difficult by reason of the inclination of the wall portion thru which they pass, and, as the box may be inserted in any position in the collars, it may always be held in the most convenient position with relation to the direction in which the conductors run, while the collars may always be placed in the position described, with relation to the laths. After the conductors have been clamped, the fixture may be attached and the connections made in the usual manner. The above described clamp, which comprises the collars and screws for clamping the wall between the collars about the edges of the wall opening, may be advantageously employed in connection with the installation of any form of electrical outlet, whether it is an outlet junction, or switch box, which is located within the collars, back of the wall surface, or a mere plate which closes the opening at the surface, and co-operates with the fixture canopy to form a casing for the connections, but it possesses additional advantages, when the box or plate, which is attached thereto, is required to act as a fixture support, for the collars as it not only permits the formation of as large wall opening as practicable through which the workman may conveniently work, in "fishing" the conductors, so that the possibility of accidental damage to the plaster, while this operation is being performed, is practically eliminated, but at the same time, after the fishing operation has been performed, the clamp then provides a strong and reliable support for the fixture which is attached to the box or plate.

It is also to be noted that when the inner collar 2 is being clamped in position, the workman may insert his hand in the wall opening and hold the collar in position until it is securely clamped. This is especially important when the installation is in a side wall, where the collar would not be held in position by gravity, as it would be in a ceiling, and would be liable to fall down between the inner and outer walls of the building. The flange 2ª on the collar, by being inserted in the wall opening at the time the collar is clamped, also greatly assists the workman in holding it in position while this work is being performed. The fact, however, that the wall opening is not closed by the box until after its securing means is clamped in position for convenient attachment of the box is of great practical importance.

The construction may be manufactured by a dieing-out operation, as the entire box may be struck out of a metal sheet, and the collars may be similarly formed.

I claim:

1. In combination, an outlet box and supporting means therefor consisting of a back clamping plate having an outwardly turned rim adjacent to the opening therein, a front clamping plate having an inwardly turned rim adjacent to the opening therein, the said rims being oppositely disposed to form a combined opening of uniform diameter, means for permanently uniting the said clamping plates, the said means being adapted to temporarily hold the back clamping plate in position behind the wall opening while placing the front clamping plate in position in front of the said wall opening, and means for attaching the outlet box to one of the clamping plates.

2. As an article of manufacture, a pair of similar clamping plates, the back clamping plate being tapped to receive clamping screws, the front clamping plate having key hole slots for the same screws and one of the said plates having tapped openings to receive the supporting screws of an outlet box.

3. A supporting clamp for an outlet box comprising an inner collar adapted to engage the inside of the laths about a wall opening and an outer collar adapted to engage the outside surface of the plaster about the said wall opening, connecting means for holding the collars in engagement with the said laths and plaster, respectively, the collars having spaces therein for the insertion of an outlet box, tapped holes in the inner collars to receive the supporting screw of an outlet box, and openings in the outer collar to provide access for attaching an outlet box to the inner collar.

4. That method of mounting an outlet box in a finished lath and plaster wall, which consists in cutting an opening through the plaster and laths, inserting through the opening a clamping collar designed to bear against the inside surface of the laths at the edges of said opening, placing a similar clamping collar against the plaster around the front edges of the opening, permanently securing the two clamping collars together to form an opening having its inside and outside edges protected by the said collars, inserting into the said opening an outlet box having outwardly turned portions for the box supporting screws, and securing the outlet box to one of the clamping collars.

In testimony whereof, I have signed my name to this specification.

JOHN JAMES MERRILL.